United States Patent
Ji (10) Patent No.: US 9,819,671 B2
(45) Date of Patent: Nov. 14, 2017

(54) PROMPTING LOGIN ACCOUNT

(71) Applicant: Alibaba Group Holding Limited, Grand Cayman (KY)

(72) Inventor: Lijuan Ji, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 22 days.

(21) Appl. No.: 14/755,110

(22) Filed: Jun. 30, 2015

(65) Prior Publication Data

US 2016/0006717 A1 Jan. 7, 2016

(30) Foreign Application Priority Data

Jul. 2, 2014 (CN) .......................... 2014 1 0313035

(51) Int. Cl.
*H04L 29/06* (2006.01)
*G06F 17/30* (2006.01)
*G09C 1/00* (2006.01)
*G06F 21/31* (2013.01)

(52) U.S. Cl.
CPC ...... *H04L 63/083* (2013.01); *G06F 17/30864* (2013.01); *G06F 21/31* (2013.01); *G09C 1/00* (2013.01); *G06F 2221/2131* (2013.01)

(58) Field of Classification Search
CPC ..... H04L 63/083; H04L 9/3226; G06F 21/30; G06F 21/128; G06F 21/62; G06F 2221/2141; G06F 21/31
USPC .................................. 726/2–4, 7, 27–28, 30
See application file for complete search history.

(56) References Cited

U.S. PATENT DOCUMENTS

| | | | | |
|---|---|---|---|---|
| 6,408,306 | B1* | 6/2002 | Byrne | ............... G06F 17/30985 |
| 8,196,180 | B2* | 6/2012 | Keeler | ................ G06Q 20/206 |
| | | | | 380/247 |
| 2002/0112153 | A1 | 8/2002 | Wu et al. | |
| 2007/0169181 | A1 | 7/2007 | Roskind | |
| 2010/0017616 | A1* | 1/2010 | Nichols | ................... G06F 21/41 |
| | | | | 713/183 |

(Continued)

OTHER PUBLICATIONS

Methods for precise named entity matching in digital collections, Davis et al, 10.1109/JCDL.2003.1204852, IEEE 2003.*

(Continued)

*Primary Examiner* — Jahangir Kabir
(74) *Attorney, Agent, or Firm* — Lee & Hayes, PLLC (57) ABSTRACT

A login request initiated by a user at a current page is received. Whether there exists an account record matched with a login account name and login password combination in the login request is searched from an account table of the current page. If a result is positive, the user is allowed to log in. If a result is not positive, a preconfigured account name collection corresponding to the login account name is acquired. The account name collection includes login account names of the user's registered accounts in a plurality of member systems. A login account name in a member system to which the current page belongs is searched from the account name collection, and the found login account name is provided to the user. The techniques of the present disclosure prompts a correct login account name to the user, especially when there are many user login account names, thereby reducing memory burden of the user and assisting the user in implementing a quick login under multi-account management.

17 Claims, 10 Drawing Sheets

(56) References Cited

U.S. PATENT DOCUMENTS

| | | |
|---|---|---|
| 2013/0174236 A1 | 7/2013 | You |
| 2014/0053251 A1 | 2/2014 | Chen et al. |
| 2014/0372303 A1* | 12/2014 | Gafni .................... G06Q 20/40 705/44 |
| 2015/0067804 A1* | 3/2015 | Maxwell ............... H04L 63/083 726/7 |
| 2016/0197904 A1* | 7/2016 | Taratine ................ G06Q 50/01 726/4 |
| 2017/0034118 A1* | 2/2017 | Gupta ................... H04L 43/045 |

OTHER PUBLICATIONS

PCT Search Report and Written Opinion mailed Sep. 29, 2015 for PCT Application No. PCT/US15/38506, 10 pages.

* cited by examiner

| |
|---|
| Short Message |
| Sender: 123456 |
| XX website reminds you: please try the following login account names:<br><br>Bestipr123; Bestipr111. |

PROMPTING LOGIN ACCOUNT

CROSS REFERENCE TO RELATED PATENT APPLICATION

This application claims foreign priority to Chinese Patent Application No. 201410313035.0 filed on Jul. 2, 2014, entitled "Method and Apparatus for Prompting Login Account," which is hereby incorporated by reference in its entirety.

TECHNICAL FIELD

The present disclosure relates to the field of account management technology, and, more particularly to a method and apparatus for prompting a login account name.

BACKGROUND

Currently, various websites and forums have their own independent member systems. A user has to register an account and use a corresponding service only after using a corresponding login account name and login password to log in. With a growing number of websites and forums that need account registration, each user needs to manage more and more account information, which will easily result in the user getting confused or forgetting his/her own login account name.

The conventional techniques provide the functionality of "retrieving account name," which retrieves a correct login account name to the user through an identification authentication. However, the identification authentication is generally implemented through methods, such as "answering authentication questions," "e-mail verification," and "short messages verification," which are quite complicated. For example, if the user registers an account a long time ago or carelessly filling in an account registration form, the user often forgets the answers to the authentication questions. If the user manages a plurality of e-mail addresses and phone numbers at the same time, it may be necessary for the user to make repeated attempts, and the process of "short messages verification" may even not work if the user changes his/her phone number previously used for registration.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a novel technical solution to solve the technical problem of login failure caused by separate management of a plurality of login account names in the conventional techniques.

The present disclosure provides the following technical solutions:

According to a first aspect of the present disclosure, a method for prompting a login account name is provided, which includes the following operations.

A login request initiated by a user at a current page is received. Whether there exists an account record matched with a login account name and login password combination in the login request is searched from an account table of the current page. If a result is positive, the user is allowed to log in. If a result is not positive, a preconfigured account name collection corresponding to the login account name is acquired. The account name collection includes login account names of the user's registered accounts in a plurality of member systems. A login account name in a member system to which the current page belongs is searched from the account name collection, and the found login account name is provided to the user.

According to a second aspect of the present disclosure, an apparatus for promoting a login account name is provided, which may include the following units.

A login unit receives a login request initiated by a user at a current page, searches, in an account table of the current page, whether there exists an account record matched with the login account name and login password combination in the login request, and if so, allows the user to log in. An acquisition unit acquires a preconfigured account name collection corresponding to the login account name if no matched account name exists. The account name collection includes login account names of the user's registered accounts in a plurality of member systems. A search unit searches, from the account name collection, a login account name in a member system to which the current page belongs. A prompt unit prompts the found login account name to the user.

As shown from the above technical solution, the present disclosure actively prompts a correct login account name to the user, especially when the user has many login account names, thereby reducing a memory burden on the user and assisting the user in implementing a quick login under multi-account management.

DETAILED DESCRIPTION

The techniques of the present disclosure actively prompts a correct login account name to a user, which is helpful for reducing the memory burden on the user, and assists the user in implementing a quick login under multi-account management especially when the user has many login account names.

Figure 1:
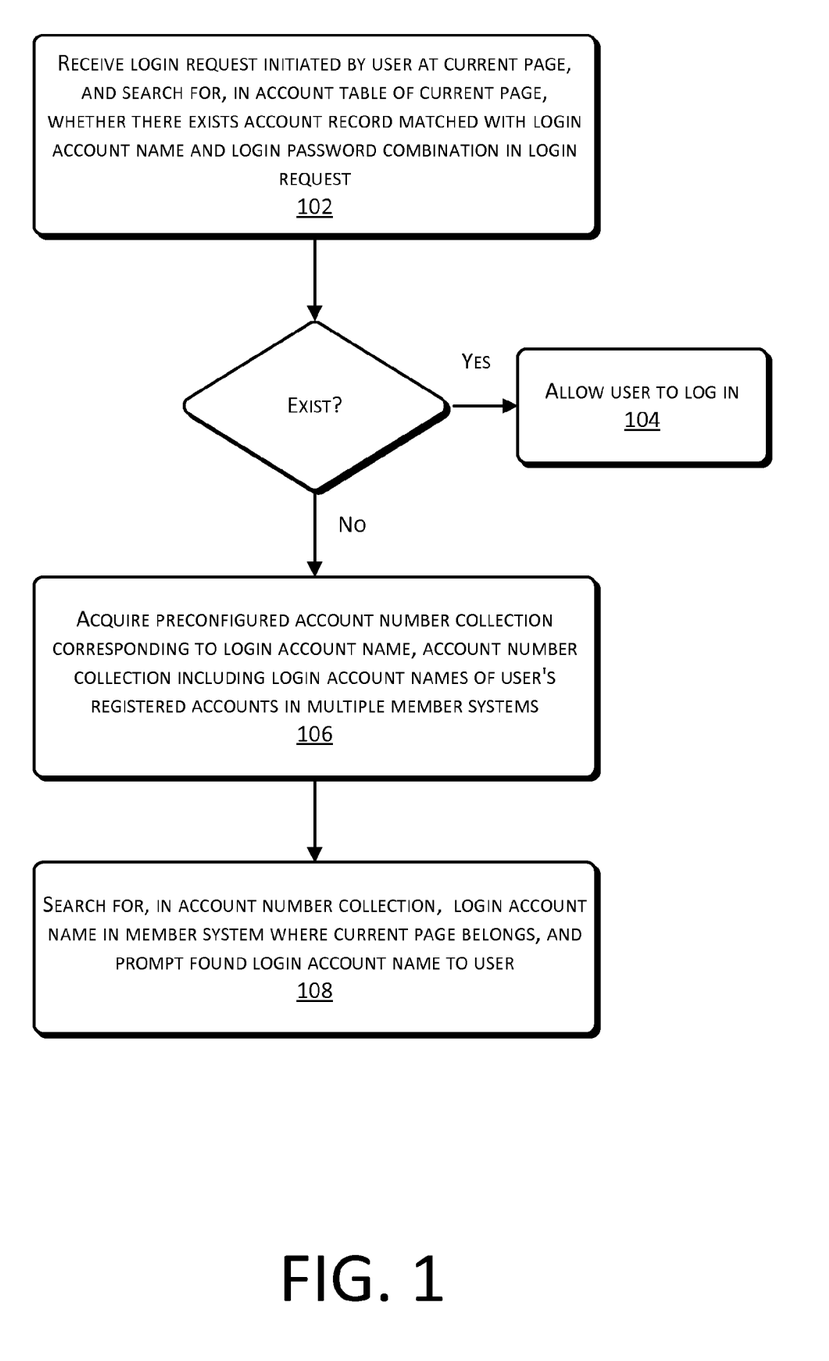
FIG. 1 illustrates a flow chart of an example method for prompting a login account name according to an example embodiment of the present disclosure.

To further illustrate the present disclosure, the following example embodiments are provided:

FIG. 1 illustrates a flow chart of an example method for prompting a login account name according to an example embodiment of the present disclosure.

As shown in FIG. 1, the method for prompting a login account name according to an example embodiment of the present disclosure may be applied at a server, which may include the following operations.

At 102, a login request initiated by a user at a current page is received. In an account table of the current page, whether there exists an account record matched with a login account name and a login password combination in the login request is searched.

For example, when a server manages user account information, login information may be stored in a form of a combination of "login account name+login password." A browser generates a login request according to a login account name and login password input by a user at a current web page, and accordingly the server searches for a corresponding account name, thereby authenticating a true identification of the user who initiates the login request.

At 104, if there exists such account record, the user is allowed to log in.

At 106, if there does not exist such account record, a preconfigured account name collection corresponding to the login account name is acquired. The account name collection includes login account names of the user's registered accounts in a plurality of member systems.

For example, although the combination of the login account name and login password input by the user does not exist in the member system corresponding to the current page, since the user actively inputs the login account name, it indicates that the user may be the owner of the login account name at another website. For example, if the user inputs a login account name for a website Alipay™ Wallet on a web page for a website Taobao™, by preconfiguring and generating an account name collection corresponding to each user, the current user is confirmed according to the login account name for Alipay™ Wallet input by the user, and then the login account name for Taobao™ will be found from the account name collection corresponding to the user.

At 108, in the account name collection, a login account name in a member system to which the current page belongs is searched, and if it is found, the found login account name will be prompted to the user. Certainly, if no login account name of the user in the member system to which the current page belongs is found, there might be no prompt, or a reminding message such as "No associated login account name is found" will be prompted directly.

As shown from the above example embodiment, with the preconfigured account name collection, a login account name corresponding to the current page may be found automatically according to a complete login account name input by the user, and, by prompting the found login account name to the user timely, the user may avoid complicated process of retrieving the password and does not need to remember all of the login account names, which helps the user implement effective management and quick use of a plurality of login account names.

However, when the user actively inputs a certain login account name at 102, the user may input it randomly. That is, the user may not be an actual owner of the input login account name. Therefore, to avoid an association and prompt for such login account name input by the user at random, some methods may be used to derive the user's true intention. For example, a button related to a function such as "Retrieve account" may be provided on a login page. If the user really wants to perform a normal login operation by using an account name, the user will hope to figure out the correct login account name through clicking the button "Retrieve account". However, with respect to the user who inputs the account at random, after a failure, the user may change a login account name or a password to try again, or stop trying directly.

Certainly, even if there is an association and prompt for the login account name input by the user at random, it will not result in any leakage of the user account information. Because even if the user knows other people's login account name, if the user does not know the login password, the user still cannot pass the authentication based on the combination of "login account name+login password", and still cannot implement a normal account name login, thereby preventing the account from security risks.

Based on the above technical solution, the techniques of the present disclosure may be divided into two stages: in Stage I, for each user, a corresponding account name collection is pre-generated, each account name collection including all of the login account names of a corresponding user in a plurality of member systems; in Stage II, when the user uses a certain login account name to log in but the login fails, a possibly correct login account name may be prompted according to the account name collection corresponding to the user. The two stages are described below in detail.

Stage I:

1. Based on Account-Binding Relation

Figure 2:
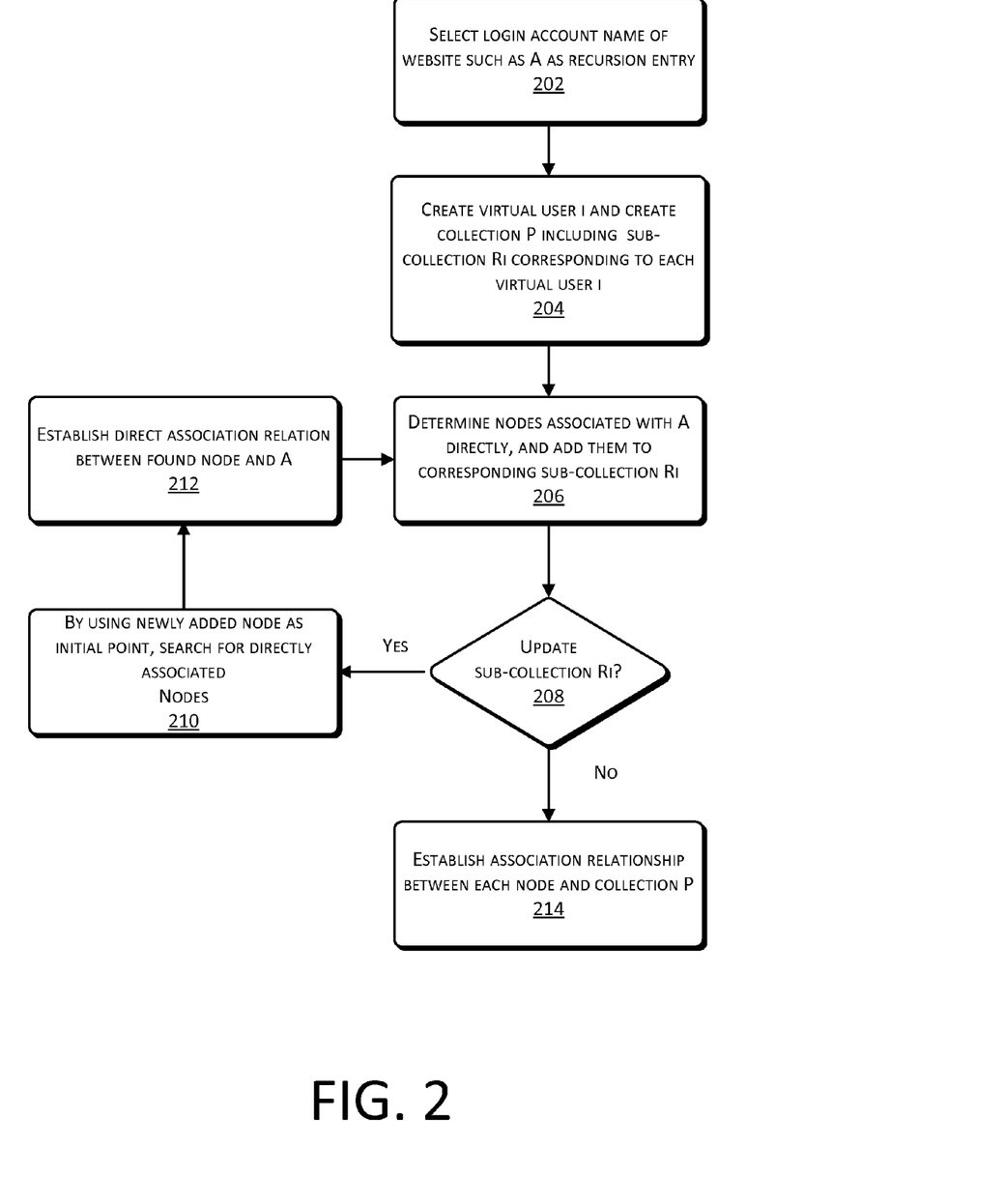
FIG. 2 illustrates a flow chart of an example method for generating an account name collection according to an example embodiment the present disclosure.

FIG. 2 illustrates a flow chart of an example method for generating an account name collection according to an example embodiment of the present disclosure.

Referring to FIG. 2, the method for generating an account name collection according to an example embodiment of the present disclosure may include the following operations.

The techniques of the present disclosure herein are illustrated by using a "website" platform as an example. The techniques of the present disclosure are also applicable to other platforms such as "forums," or "communications or social software," which are not limited herein. At 202, a login account name of a website, such as A, as a recursion entry is selected. For example, account data of websites will be collected as much as possible, and any website may be selected as a recursion entry, for example, website A.

At 204, a virtual user "i" corresponding to each account in the website A is created. A collection P is created. The collection P includes a sub-collection Ri corresponding to each virtual user i. The sub-collection Ri is used for recording all of the login account names of the virtual user i in a plurality of member systems.

Figure 3A:
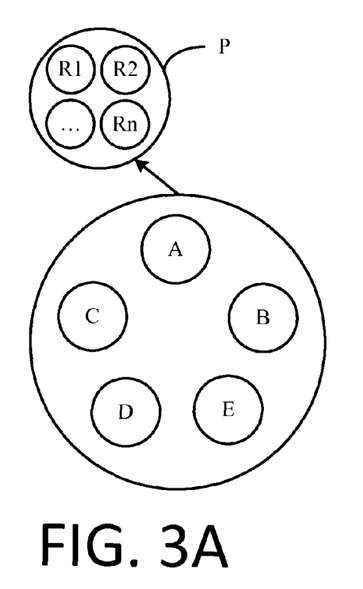
FIGS. 3A-3F illustrate diagrams of generating an account name collection according to an example embodiment of the present disclosure.

For example, as shown in FIG. 3A, it is assumed that all account data of the website A, website B, website C, website D, and website E is collected at 202. Thus, a sub-collection R1, a sub-collection R2, . . . , a sub-collection Ri, . . . , a sub-collection Rn in the collection P record all of the login account names of the corresponding virtual user 1, a virtual user 2, . . . , a virtual user i, . . . , a virtual user n in the above websites respectively. n may be any integer.

At 206, the website A is used as an initial node, and for each virtual user i, nodes directly associated with the initial node are determined and added to the corresponding sub-collection Ri.

For example, it is assumed that any user W of the website A has the following registration information in various websites as shown in Table 1. The user W registers accounts on the website A, website B, website C, website D, and the website E respectively, that is, account a, account b, account c, account d, and account e corresponding to the above websites respectively.

TABLE 1

| | Website | | | | |
|---|---|---|---|---|---|
| | A | B | C | D | E |
| Account | a | b | c | d | e |
| Bound Account | b | d, e | — | c | — |

Figure 3B:
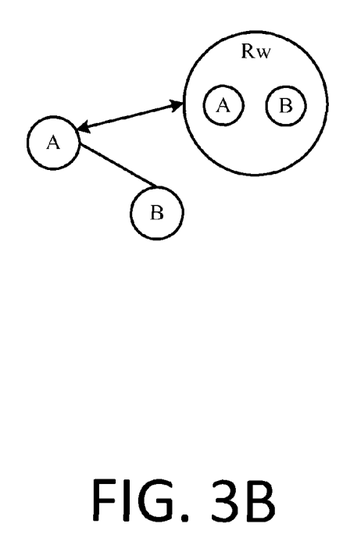

For example, since the user W binds the account a with the account b in the website B directly, the techniques of the present disclosure determine that, for the user W, the node directly associated with the website A is the website B. Thus, as shown in FIG. 3B, the website B needs to be added into the sub-collection Rw corresponding to the user W. (It should be noted that, since the website A is the initial node corresponding to the user W, the website A has already been added into the sub-collection Rw when the sub-collection Rw is created).

At 208, whether the sub-collection Ri is updated or not is determined. If Ri is updated, operations at 210 are performed. Otherwise, operations at 214 are performed. By still using the user W as an example, since at 206, the website B is added into the sub-collection Rw, that is, there is an update, operations at 210 will be performed for further processing.

Figure 3C:
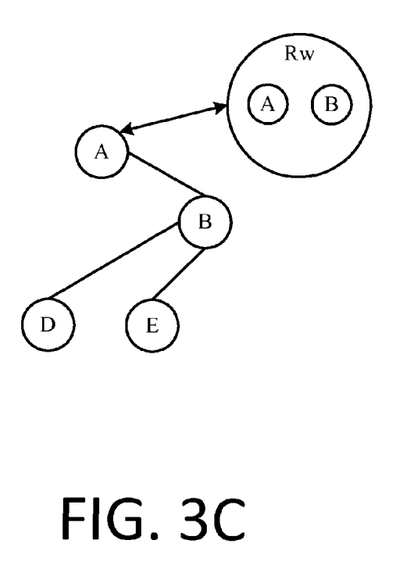

At 210, by using the newly added node as an initial point, nodes directly associated therewith are searched. By using the user W as an example, in this case, the "newly-added node" is the website B, and it is necessary to search for the nodes associated with the website B directly. As known from the account information shown in Table 1, the account b binds with the account d and the account e directly. Thus, as shown in FIG. 3C, the nodes directly associated with the website B are the website D and the website E.

Figure 3D:
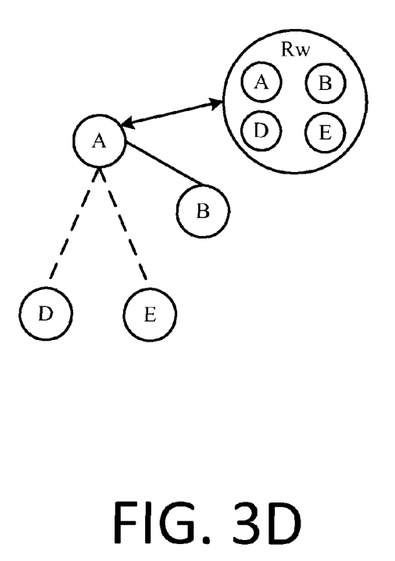

At 212, direct association relationships between the found nodes and the initial node A are established. For example, as shown in FIG. 3D, for the user W, since there exists a direct association relationship between the website A and the website B, and the website B has a direct association relationship with the website D and the website E respectively, the website A apparently has an association relationship with the website D and the website E. Thus, the direct association relationships are established between the website A and the website D and the website E.

Figure 3E:
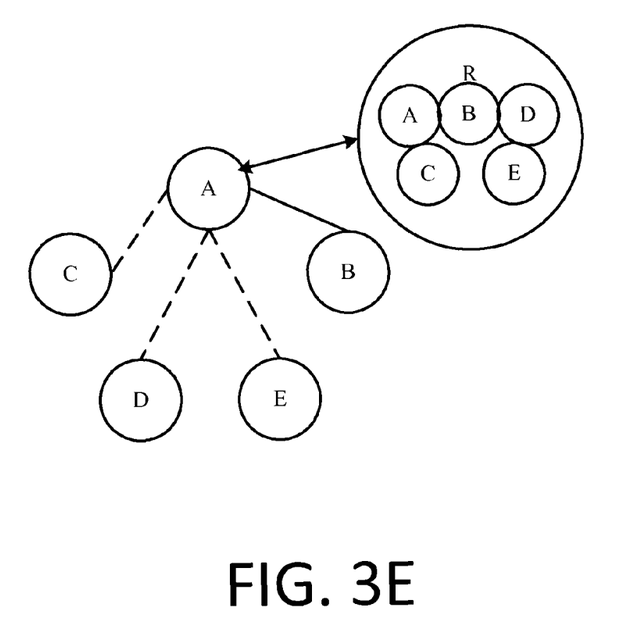

Then, after 212, operations at 206 will be performed again, and the nodes directly associated with the website A are added into the collection Ri. For the user W, in this case, the nodes directly associated with the website A are the website B, the website D, and the website E (there exists a direct account binding relationship between the website B and the website A, and the direct association relationships between the website D, the website E and the website A are established at 212), which need to be added into the sub-collection Rw, as specifically shown in FIG. 3D. Meanwhile, by comparing FIG. 3B with FIG. 3D, it shows that the website D and the website E are newly added nodes. That is, when operations at 208 are performed once again, the collection Rw is determined to be updated, so that operations at 210 will be performed again, and the nodes directly associated with the newly added website D and website E will be searched. For example, as known from Table 1, the user W's account d in the website D has a direct account binding relationship with the account c in the website C. Thus, in a loop of operations from 206 to 212, a direct association relationship between the website C and the website A is established, and the website C is added to the collection Rw (as shown in FIG. 3E).

To sum up, by recursively searching from 206 to 212, the techniques of the present disclosure finally determine that, for the user W, the website B, the website C, the website D, and the website E all have a direct or indirect account binding relation with the website A. When a certain node is added into the sub-collection Ri, in fact, an information pair of "Login account name—Website ID" is recorded into the sub-collection Ri. For example, for the user W, a similar mode as shown in Table 2 may be used for recording.

TABLE 2

| Login account name | Website ID |
|---|---|
| 123 | A |
| 111 | B |
| asd | C |
| ccc | D |
| 123 | E |

Figure 3F:
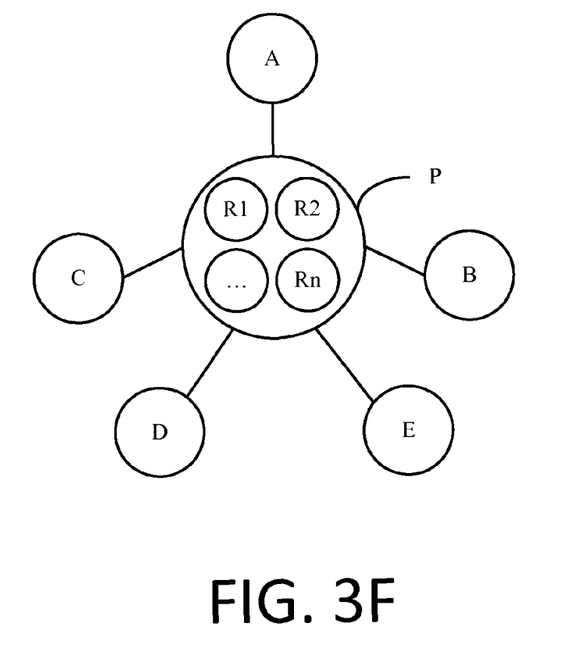

At 214, an association relationship among each node and the collection P is established. As shown in FIG. 3F, through the above processing, each sub-collection Ri in the collection P is improved. Thus, the association relationships among the node A, the node B, the node C, the node D, the node E, etc., and the collection P may be established respectively, such that once a login account name input by the user at any of the above nodes is incorrect, the techniques of the present disclosure may associate the login account name or the website to which the login account name is input with the collection P to search for a correct login account name.

2. Based on User Information

In addition to the account binding relationships among the accounts, the accounts may be bound with detailed user information, for example, a phone number, an email address, an Identification (ID) Number, etc. When different accounts record the same user information as mentioned above, the accounts may belong to the same user. Thus, even if there exists no account binding relationship among the accounts, associated accounts may still be found based on the shared user information.

Figure 4:
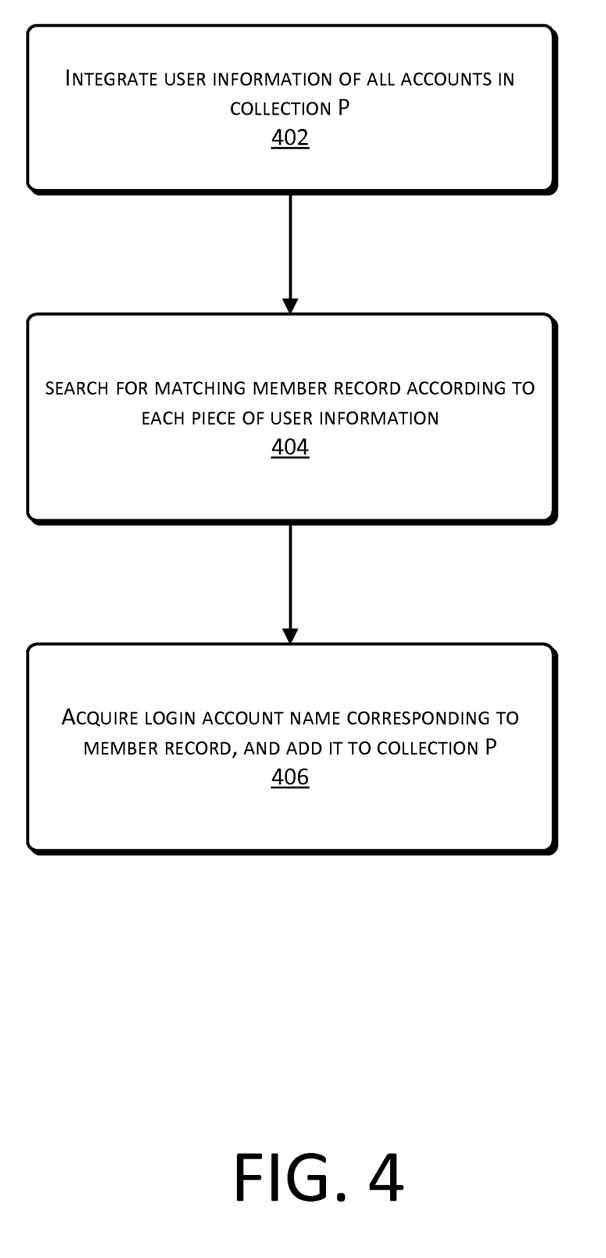
FIG. 4 illustrates a schematic flow chart of generating an account name collection according to another example embodiment of the present disclosure.

Referring to FIG. 4, an example process for generating an account name collection based on user information is described below in detail, which may include the following operations.

At 402, a collection P generated from an account binding relationship is acquired, and user information of all of the accounts in the collection P is integrated. For example, with respect to all sub-collections Ri in the collection P, user information recorded in the accounts corresponding to each sub-collection Ri is integrated respectively. Although all of the accounts in each sub-collection Ri belong to the same user, the user may use a plurality of e-mail addresses, phone numbers, and so on at the same time, which may be used to search for more accounts belonging to the same user.

For example, since in the sub-collection Rw corresponding to the user W, the recorded nodes include the website A, the website B, the website C, the website D, and the website E. Thus, the user W's information bound in the accounts of those websites is integrated respectively. For example, as shown in Table 3, the user W's account a in the website A and account b in the website B are both bound with a phone number 13987654321, and the account b in the website B, the account d in the website D, and the account e in the website E are bound with a email address 123@xx.com respectively, and the account c in the website C and the account d in the website D are bound with a phone number 13123456789 respectively, and the account c in the website C is bound with an email address 12345@xx.com individually. Thus, for the user W, the integrated information includes: a phone number 13987654321, a phone number 13123456789, an email address 123@xx.com, and an email address 12345@xx.com.

TABLE 3

| Website | Account | Bound Phone Number | Bound Email Address | ... |
|---------|---------|--------------------|--------------------|-----|
| A | a | 13987654321 | — | ... |
| B | b | 13987654321 | 123@xx.com | ... |
| C | c | 13123456789 | 12345@xx.com | ... |
| D | d | 13123456789 | 123@xx.com | ... |
| E | e | — | 123@xx.com | ... |

At 404, according to each piece of user information, a matched member record is searched in the collected account data, that is, the user's registered account in such member system.

Through the process shown in FIG. 2, the nodes recorded in Ri are acquired based on the account binding relationships among the accounts. When the search is performed based on the integrated user information at 404, it is not limited by the account binding relationships and thus more associated nodes or accounts may be found.

For example, as shown in Table 4, through the email address 12345@xx.com recorded by the user W's account c in the website C, the techniques of the present disclosure find that there also exists an account a', which uses the same email address, in the website A. Meanwhile, by expanding the number of websites for analysis, for example, the techniques of the present disclosure may further find that an account f of the user W in the website F also uses the same email address, and even new user information may be acquired from the newly found account, for example, a phone number 18654321234 bound in the account f, thereby implementing a further search.

TABLE 4

| Website | Account | Bound Phone Number | Bound Email address | ... |
|---------|---------|--------------------|--------------------|-----|
| C | c | 13123456789 | 12345@xx.com | ... |
| A | a' | — | 12345@xx.com | ... |
| F | f | 18654321234 | 12345@xx.com | ... |

At 406, a login account name corresponding to the found member record is acquired and added to the collection P.

Figure 5:
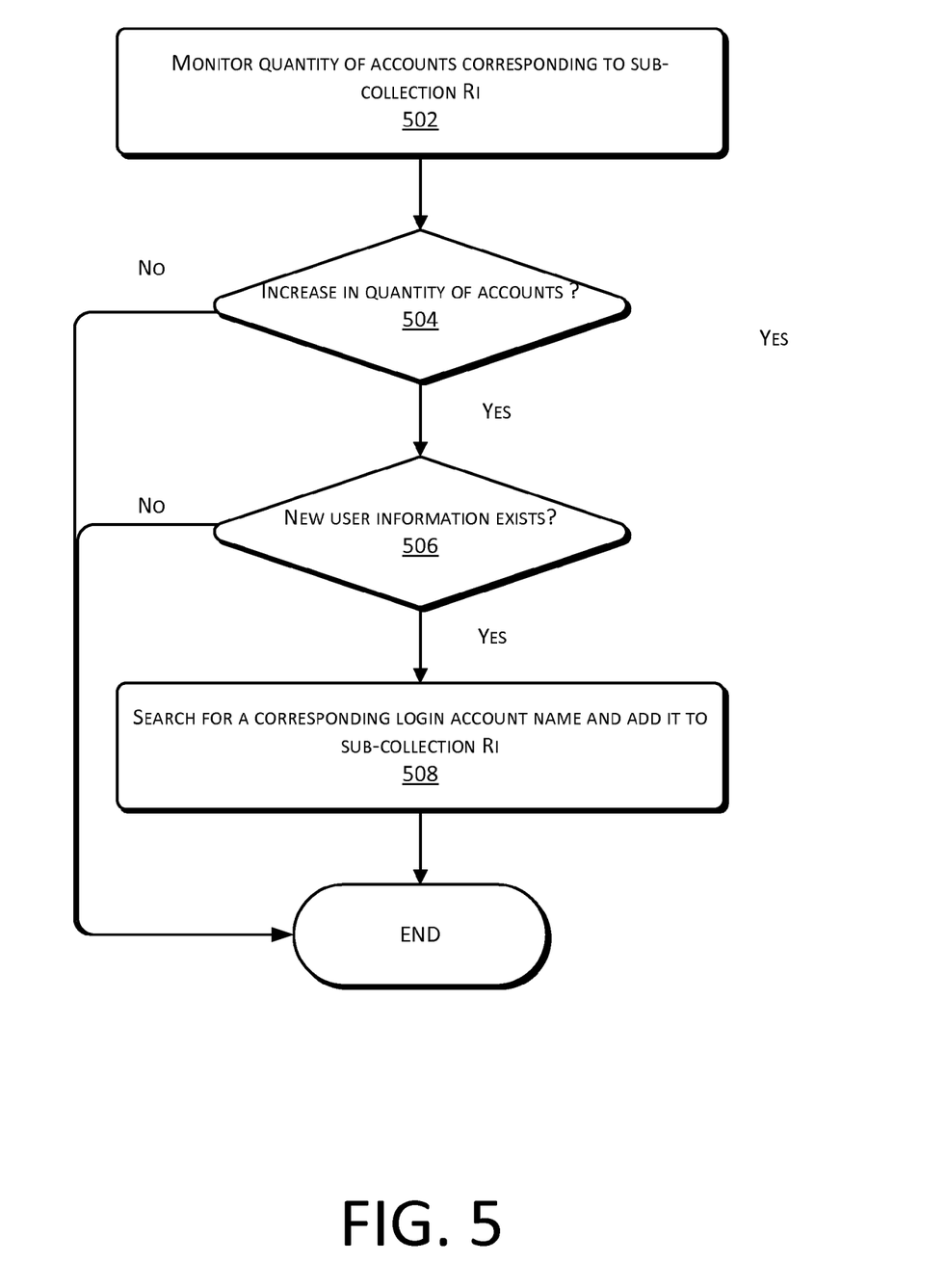
FIG. 5 illustrates a flow chart of an example method for generating an account name collection according to another example embodiment of the present disclosure.

Through the technical solutions shown in FIGS. 2 and 4, that is, by firstly determining a portion of accounts belonging to a current user based on the account binding relationships among the accounts and then determining another portion of the accounts that do not have the account binding relationships based on the user information recorded in the accounts, most of the accounts belonging to the same user may be determined. When the accounts are searched based on the user information (as shown in FIG. 4), the search of accounts may also be implemented as shown in FIG. 5, which may include the following operations.

At 502, a quantity of accounts corresponding to each sub-collection Ri is monitored.

At 504, according to the monitoring result, whether there is an increase in the quantity of accounts corresponding to the sub-collection Ri is determined. If there is the increase, operations at 506 are performed.

It should be noted that a starting time for monitoring the quantity of accounts corresponding to the sub-collection Ri may be set according to the actual requirements. For example, the monitoring operation may start when the sub-collection Ri is initially created, and then an initial quantity of account is set at 0. When there is an increase in the quantity of accounts due to the direct or indirect account binding relationships among the accounts, there is an increase in the quantity of accounts corresponding to the sub-collection Ri. Alternatively, as another example, after the searching for the accounts based on the account binding relationship is completed, the subsequent change in the quantity of accounts may be monitored based on the accounts having the account binding relationship in the sub-collection Ri.

At 506, if the quantity of accounts in the sub-collection Ri increases, whether the increased account is bound with new user information, that is, user information different from those bound with the accounts in the sub-collection Ri before the quantity of account increases, is further determined. If there exists new user information, operations at 508 are performed.

At 508, accounts corresponding to the new user information are searched, and a corresponding login account name is added into the sub-collection Ri, which, for example, may use a data structure as shown in Table 2.

As shown from the above technical solutions, the techniques of the present disclosure as shown in FIG. 5 actually acquire the user information and search for the accounts recursively based on the technical solution shown in FIG. 4, thereby rendering the information in the sub-collection Ri more complete. For example, in Table 4, the account c and the account a', and the account f do not have direct account binding relationships. The technical solution shown in FIG. 4, based on the email address 12345@xx.com in the account c, find the account a' and account f that also use such email address; while the technical solution shown in FIG. 5, based on the phone number 18654321234 recorded in the account f, further search other accounts that use the same phone number.

Stage II:

According to the technical solutions in Stage I, with respect to each user, there exists a corresponding sub-collection Ri in the collection P which includes login account names of the corresponding user in all member systems.

Figure 6A:
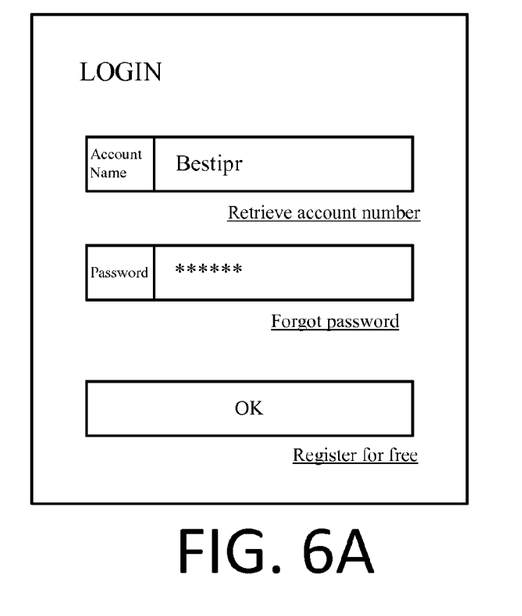
FIGS. 6A-6C illustrate diagrams of example interfaces for promoting a login account name according to an example embodiment of the present disclosure.

Assuming that the user W performs an account login in the interface shown in FIG. 6A, the user W needs to input a corresponding login account name and a login password into entry boxes of "Account" and "Password" respectively. For example, the login account name input by the user W is "Bestipr."

Figure 6B:
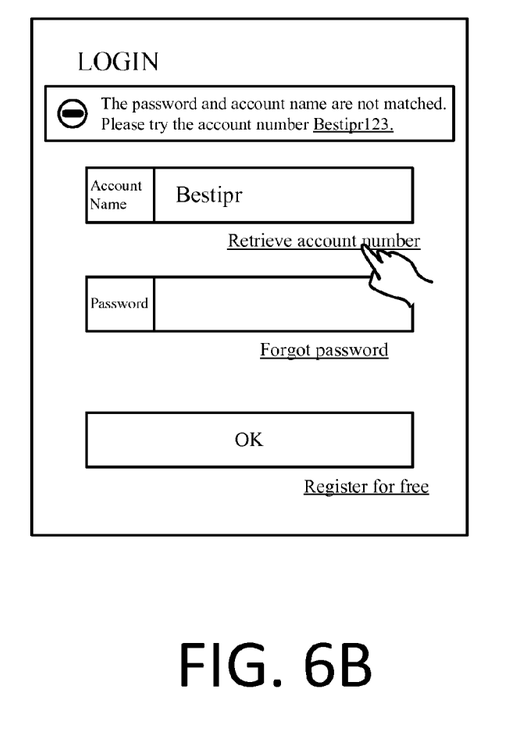

The server acquires a combination including the login account name "Bestipr" input by the user W and the corresponding login password, and searches for matched account information in the account table. If it is found, a corresponding account login will be performed directly. Otherwise, a prompt message "The password and the account name are not matched" as shown in FIG. 6B will be returned to remind the user W of incorrect input.

Meanwhile, according to the page where the user W inputs the login account name "Bestipr," the server will associate the page with the collection P (through the associating relationships among each website and the collection P as shown in FIG. 3F), and search for a correct login account name corresponding to the user W at the current page in the collection P by using "Bestipr" as a keyword.

In the conventional techniques, there exist a number of data search functions, all of which may be applied to the search of the login account names in the present disclosure. For example, the login account name "Bestipr" may be used as a keyword to traverse all of the records in the collection P directly. That is, "Bestipr" is matched with each piece of the records in the collection P one-by-one. When a matched record is found, the sub-collection Rx including such record corresponds to the user W, and a correct login account name corresponding to the current page is searched in the sub-collection Rx.

However, when there is a large quantity of data in the collection P, the process of traversing may result in an inefficient search for the login account names, and occupy many processing resources. Therefore, to avoid the above problems, a corresponding index may be generated for all of the records in the collection P. When matching the keyword "Bestipr," firstly, a search area corresponding to the keyword "Bestipr" will be determined according to the index, and the matching is only performed in the records corresponding to such search area. For example, when the index is generated, the index corresponding to each record will be sorted according to the first letter. In the determination of the search area corresponding to the keyword "Bestipr," the matching is performed only based on the records whose first letter is "B" (furthermore, by controlling the "sorting" process, such as further sorting the second letter, the matching is performed only based on the records whose first two letters are "Be"), thereby effectively reducing the quantity of data in the search, enhancing the search efficiency, and reducing the occupied operation resources.

Then, for example, when it is found that the login account name registered by the user W on the current page is "Bestipr123" as shown in FIG. 6B, the server may prompt a correct login account name to the user by providing "Please try account name Bestipr123" on the current page. Certainly, if there exist a plurality of login account names, the server may prompt message "Please try Bestipr123; Bestipr111" (not shown) with multiple account names at the same time. As an example implementation, when the user clicks on a login account name with a finger or a mouse, etc., such as clicking on a link of "Bestipr123," the current page may replace the original "Bestipr" with "Bestipr123" directly. To determine whether the user inputs the login account name "Bestipr" at random, after "the password and the account name are not matched" is prompted, if the user further clicks the function control button of "Retrieve account," the user may be considered as the owner of "Bestipr," which is not input by the user at random, and an associated correct login account name will be searched.

Figure 6C:
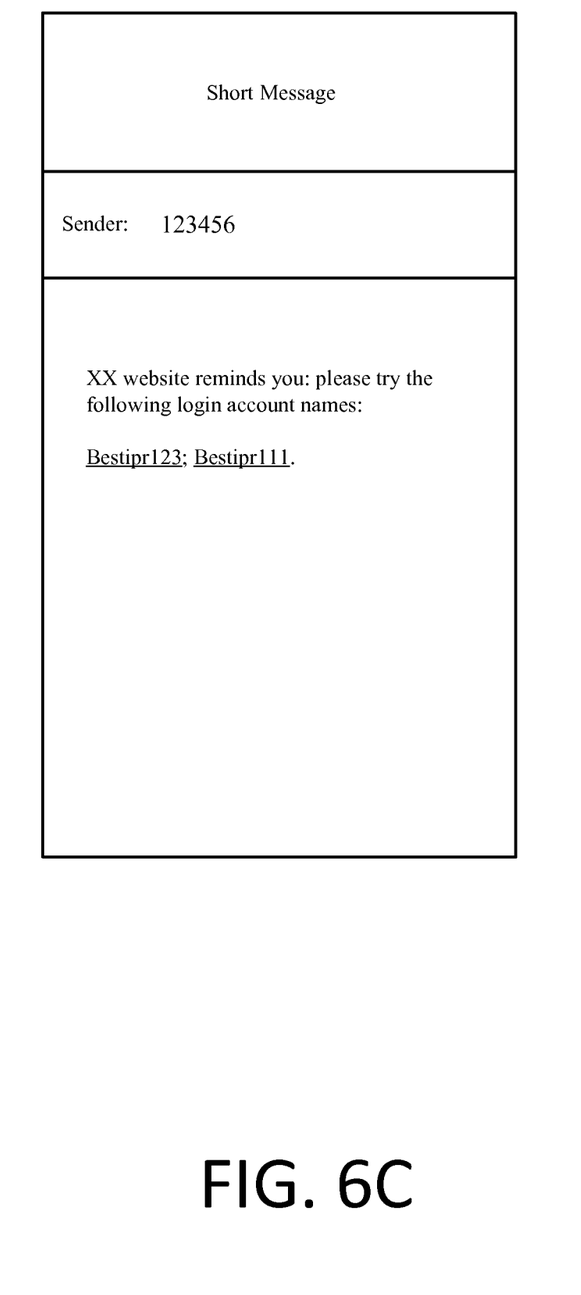

Certainly, the user may be prompted in many ways. For another example, the server may determine a phone number corresponding to the user W according to the collection P, as shown in FIG. 6C, and then prompt all of the login account names applicable to the current page (that is, "XX website" shown in the figure) to the user W by short message.

Certainly, in some cases, the login account name registered by the user W on the current page may not be found, and a login account name registered by the user W in another member system may be prompted to the user W to help the user W make attempts.

Figure 7:
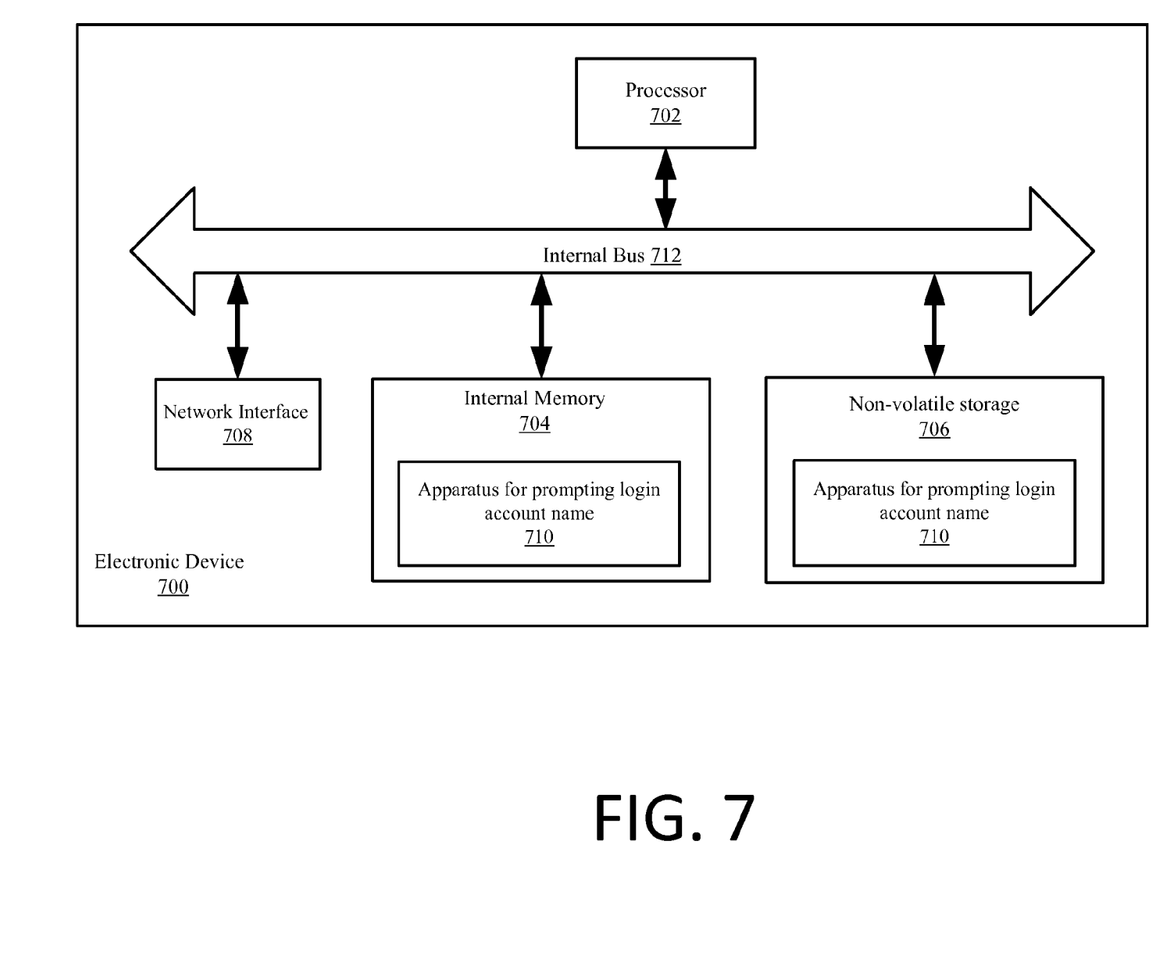
FIG. 7 illustrates a schematic diagram of an example electronic apparatus according to an example embodiment of the present disclosure.

Corresponding to the above methods for prompting the login account name, the present disclosure further provides an electronic apparatus. Please refer to FIG. 7, at the hardware level, an electronic device 700 includes one or more processor(s) or data processing unit(s) 702, an internal memory 704, and non-volatile storage 706, and may include other hardware such as input and output interfaces (not shown in FIG. 7) and network interfaces 708 needed by other services. The processors 702 read a corresponding computer program from the non-volatile storage 706 into the internal memory 704 to generate an apparatus for prompting the login account name 710 at the logic level. Such apparatus for prompting the login account name 710 may be considered as a part of the external service of the application system, for example, a part of the external service of the login system for Alipay™ Wallet. Certainly, in addition to the software implementation, the present disclosure does not exclude other implementations, for example, logic device or a combination of hardware and software, etc. The processor 702, the internal memory 704, the non-volatile storage 706, and the network interface 708 may be communicated with each other through internal bus 712.

Figure 8:
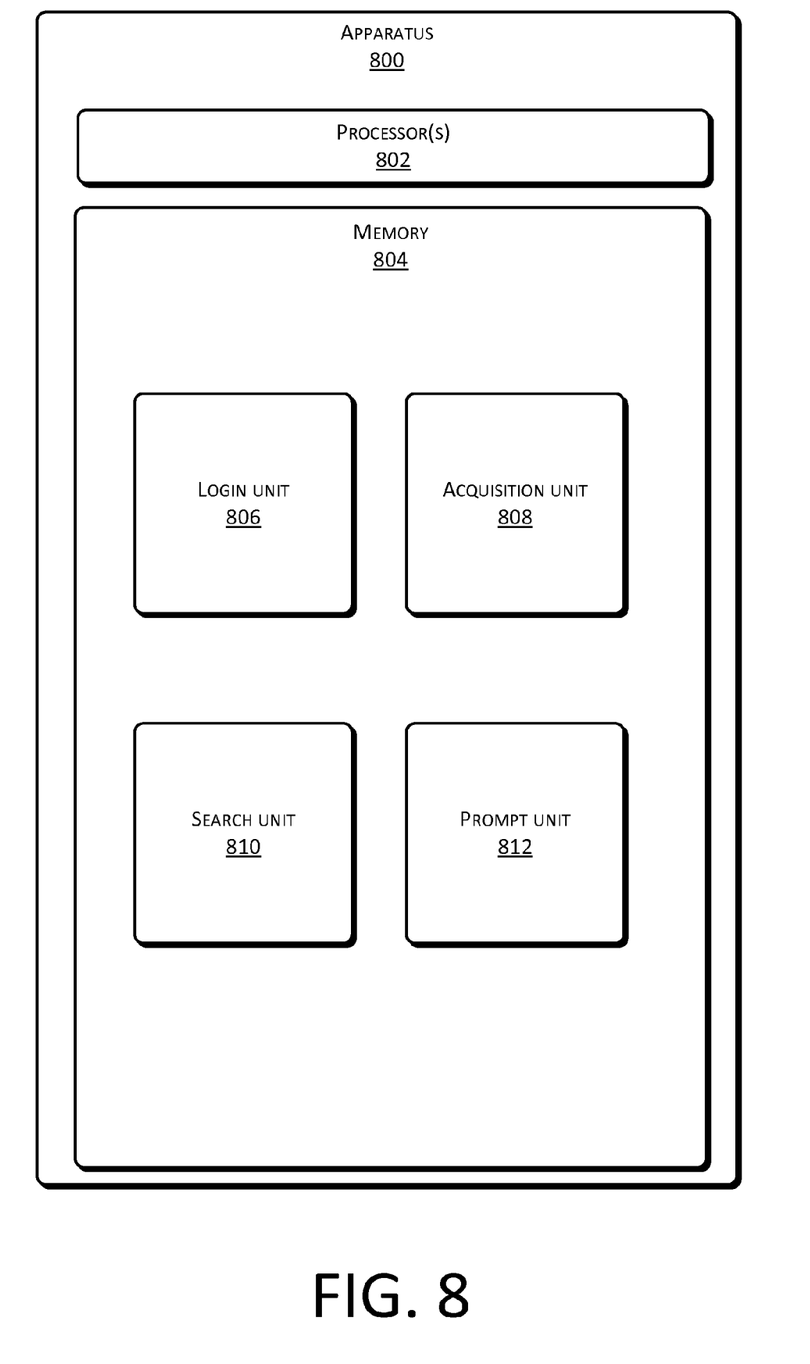
FIG. 8 illustrates a schematic diagram of an example apparatus for prompting a login account name according to an example embodiment of the present disclosure.

Please refer to FIG. 8, in an example implementation, an apparatus 800 for prompting login account name may include one or more processor(s) or data processing unit(s) 802 and memory 804. The apparatus 800 may further include one or more input/output devices and network interfaces (not shown in FIG. 8). The memory 804 is an example of computer readable media.

The memory 804 may store therein a plurality of modules or units including a login unit 806, an acquisition unit 808, a search unit 810, and a prompt unit 812.

The login unit 806 receives a login request initiated by a user at a current page, and search for, in an account table of the current page, whether there exists an account record matched with the login account name and login password combination in the login request. The login unit 802 allows the user to log in if there exists the account record matched with the login account name and login password combination in the login request.

The acquisition unit 808 acquires a preconfigured account name collection corresponding to the login account name if there does not exist the account record matched with the login account name and login password combination in the login request. The account name collection includes login account names of the user's registered accounts in a plurality of member systems.

The search unit 810 searches for, in the account name collection, a login account name in a member system to which the current page belongs.

The prompt unit 812 prompts the found login account name to the user.

Optionally, the account name collection includes login account names that are determined according to an account binding relationship between a user account in any of the member systems and accounts in other member systems of the user, and the account binding relation includes a direct binding relation or an indirect binding relation.

Optionally, the account name collection further includes login account names of the accounts that are found in the plurality of member systems according to user information bound in a plurality of accounts having the account binding relationships.

Optionally, the account name collection further includes login account names of the accounts that are found in the plurality of member systems according to user information bound in a newly added account and different from those in the original account when there is an increase in the quantity of accounts in the account name collection.

Optionally, the user information may include at least one of: a phone number, an email address, an ID Number, or a combination thereof.

Optionally, the prompt unit 812 further prompts login account names of the user in another member system to the user if the search unit 810 does not find a login account name of the user in a member system to which the current page belongs.

Therefore, the techniques of present disclosure actively prompt a correct login account name to the user, especially when the user has many login account names, thereby reducing the memory burden of the user and assisting the user in implementing a quick login under multi-account management.

In a standard configuration, a computing device, such as the electronic device or the apparatus, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method comprising:
    generating a preconfigured account name collection corresponding to a user, generating the preconfigured account name collection comprising:
    adding information of a plurality of accounts of the user that are registered in a member system and one or more other member systems into the preconfigured account name collection, the one or more other member systems being different from the member system, adding the information of the plurality of accounts of the user comprising:
    determining a first portion of the plurality of accounts of the user based on one or more account binding relationships that exist among the first portion of the plurality of accounts of the user in the at least two of the member system and the one or more other member systems;
    determining a second portion of the plurality of accounts of the user that do not have an account binding relationship based on user information recorded in the first portion of the plurality of accounts of the user, wherein the user information includes at least one of a phone number, an email address, or an identification (ID) number; and
    adding information of a new account of the user into the preconfigured account name collection, and searching for one or more other accounts of the user to add into the preconfigured account name collection based on new user information in the new account, the new account being different from the plurality of accounts of the user in the preconfigured account name collection;
    receiving a login request of the user for logging into the member system, the login request including an input account name and an input password;
    searching for a matching account name registered in the member system from the preconfigured account name collection based on the input account name in response to determining that no account record that matches the input account name and the input password is registered in the member system; and
    returning the matching account name registered in the member system to the user for login after finding the matching account name in the preconfigured account name collection.

2. The method of claim 1, further comprising returning another account name registered in another member system to the user for the login.

3. The method of claim 1, further comprising searching an account table corresponding to the member system to determine whether an account record matched with the login account name and the login password in the login request exists.

4. The method of claim 1, further comprising acquiring the preconfigured account name collection based on the login account name.

5. The method of claim 1, wherein the one or more account binding relationships include at least one of a direct binding relationship or an indirect binding relationship.

6. The method of claim 1, wherein adding the information of the plurality of accounts of the user into the preconfigured account name collection further comprises determining respective account names in the one or more member systems in the preconfigured account name collection according to the user information included in the first portion of the accounts having the one or more account binding relationships.

7. An apparatus comprising:
one or more processors;
memory; and
a plurality of units stored in the memory and executable by the one or more processors, the plurality of units being configured for:
generating a preconfigured account name collection corresponding to a user, generating the preconfigured account name collection including:
adding information of a plurality of accounts of the user that are registered in a member system and one or more other member systems into the preconfigured account name collection, the one or more other member systems being different from the member system, adding the information of the plurality of accounts of the user comprising:
determining a first portion of the plurality of accounts of the user based on one or more account binding relationships that exist among the first portion of the plurality of accounts of the user in the at least two of the member system and the one or more other member systems;
determining a second portion of the plurality of accounts of the user that do not have an account binding relationship based on user information recorded in the first portion of the accounts of the user, wherein the user information includes at least one of a phone number, an email address, or an identification (ID) number; and
adding information of a new account of the user into the preconfigured account name collection, and searching for one or more other accounts of the user to add into the preconfigured account name collection based on new user information in the new account, the new account being different from the plurality of accounts of the user in the preconfigured account name collection;
receiving a login request of the user for logging into the member system, the login request including an input account name and an input password;
searching for a matching account name registered in the member system from the preconfigured account name collection based on the input account name in response to determining that no account record that matches the input account name and the input password is registered in the member system; and
returning the matching account name registered in the member system to the user for login after the matching account name is found in the preconfigured account name collection.

8. The apparatus of claim 7, wherein the plurality of units are further configured for searching an account table corresponding to the member system to determine whether an account record matched with the login account name and the login password in the login request exists in the account table.

9. The apparatus of claim 7, wherein the plurality of units are further configured for acquiring the preconfigured account name collection based on the login account name.

10. The apparatus of claim 9, wherein the plurality of units are further configured for determining one or more account names in the one or more member systems in the preconfigured account name collection according to the one or more account binding relationships.

11. The apparatus of claim 7, wherein the one or more account binding relationships include at least one of a direct binding relationship or an indirect binding relationship.

12. One or more storage devices having stored computer-executable instructions that, when executed by one or more processors, cause the one or more processors to perform operations comprising:
generating a preconfigured account name collection corresponding to a user, generating the preconfigured account name collection comprises:
adding information of a plurality of accounts of the user that are registered in a member system and one or more other member systems into the preconfigured account name collection, the one or more other member systems being different from the member system, and adding the information of the plurality of accounts of the user comprising:
determining a first portion of the plurality of accounts of the user based on one or more account binding relationships that exist among the first portion of the plurality of accounts of the user in the at least two of the member system and the one or more other member systems;
determining a second portion of the plurality of accounts of the user that do not have an account binding relationship based on user information recorded in the first portion of the plurality of accounts of the user, wherein the user information includes at least one of a phone number, an email address, or an identification (ID) number; and
adding information of a new account of the user into the preconfigured account name collection, and searching for one or more other accounts of the user to add into the preconfigured account name collection based on new user information in the new account, the new account being different from the plurality of accounts of the user in the preconfigured account name collection;
receiving a login request of the user for logging into the member system, the login request including an input account name and an input password;
searching for a matching account name registered in the member system from the preconfigured account name collection based on the input account name in response to determining that no account record that matches the input account name and the input password is registered in the member system; and
returning the matching account name registered in the member system to the user for login after finding the matching account name in the preconfigured account name collection.

13. The one or more storage devices of claim 12, the operations further comprising returning another account name registered in another member system to the user for the login.

14. The one or more storage devices of claim 12, the operations further comprising searching an account table corresponding to the member system to determine whether an account record matched with the login account name and the login password in the login request exists.

15. The one or more storage devices of claim 12, the operations further comprising acquiring the preconfigured account name collection based on the login account name.

16. The one or more storage devices of claim 12, wherein the one or more account binding relationships include at least one of a direct binding relationship or an indirect binding relationship.

17. The one or more storage devices of claim 12, wherein adding the information of the plurality of accounts of the user into the preconfigured account name collection further comprises determining respective account names in the one or more member systems in the preconfigured account name collection according to the user information included in the first portion of the accounts having the one or more account binding relationships.

\* \* \* \* \*